United States Patent
Kishimoto et al.

(10) Patent No.: US 8,233,626 B2
(45) Date of Patent: Jul. 31, 2012

(54) STORAGE SYSTEM AND STORAGE SYSTEM MANAGEMENT METHOD

(75) Inventors: Toshimichi Kishimoto, Hadano (JP); Shinichiro Kanno, Odawara (JP)

(73) Assignee: Hitachi, Ltd., Tokyo (JP)

( * ) Notice: Subject to any disclaimer, the term of this patent is extended or adjusted under 35 U.S.C. 154(b) by 962 days.

(21) Appl. No.: 12/010,979

(22) Filed: Jan. 31, 2008

(65) Prior Publication Data

US 2009/0097655 A1 Apr. 16, 2009

(30) Foreign Application Priority Data

Oct. 12, 2007 (JP) ................ 2007-267054

(51) Int. Cl.
*G06F 21/00* (2006.01)
(52) U.S. Cl. ..................... 380/277; 713/170
(58) Field of Classification Search ......... 709/277; 713/170
See application file for complete search history.

(56) References Cited

U.S. PATENT DOCUMENTS

| | | | |
|---|---|---|---|
| 6,304,973 B1 * | 10/2001 | Williams | 726/3 |
| 2002/0032489 A1 * | 3/2002 | Tynan et al. | 700/1 |
| 2002/0071557 A1 * | 6/2002 | Nguyen | 380/251 |
| 2002/0174241 A1 * | 11/2002 | Beged-Dov et al. | 709/230 |
| 2003/0037247 A1 * | 2/2003 | Obara et al. | 713/193 |
| 2003/0093466 A1 * | 5/2003 | Jarman et al. | 709/203 |
| 2003/0182552 A1 * | 9/2003 | Tanimoto et al. | 713/170 |
| 2004/0078583 A1 | 4/2004 | Kishimoto et al. | |
| 2005/0039034 A1 | 2/2005 | Doyle et al. | |
| 2005/0131902 A1 * | 6/2005 | Saika | 707/10 |
| 2006/0123236 A1 * | 6/2006 | Itoh et al. | 713/176 |
| 2007/0074069 A1 | 3/2007 | Ohno | |

FOREIGN PATENT DOCUMENTS

| | | |
|---|---|---|
| JP | 2005-044199 | 7/2003 |
| JP | 2004-139371 A | 5/2004 |
| JP | 2005-56418 A | 3/2005 |

OTHER PUBLICATIONS

Schneier, Applied Cryptography, 1996, Wiley and Sons, 2nd edition, pp. 38-39.*

* cited by examiner

*Primary Examiner* — Yin-Chen Shaw
*Assistant Examiner* — Brian Olion
(74) *Attorney, Agent, or Firm* — Volpe and Koenig, P.C.

(57) ABSTRACT

An object of the present invention is to prevent data from being tampered with, and to prevent operation mistakes, when sending and receiving data between a management software managing storage devices.

Encrypting predetermined information by using a first key managed by a first manager when temporarily keeping the predetermined information in a data holding unit; decrypting the predetermined information encrypted with a second key kept in a storage device managed by a second storage manager when moving the encrypted predetermined information to the second storage manager; and arranging the predetermined information in the second manager based on the decryption result.

10 Claims, 13 Drawing Sheets

FIG.4

```
<SerialNo>000001</SerialNo >
<ItmeName>LDEV</ItmeName>
<ItmeIndex>01:00</ItmeIndex>
<Capacity>100000GB<Capacity>
<VolumeType>VolumeType</VolumeType>
```
11

FIG.5

<ItemInfo>
· · ·
</ItemInfo>
} FIRST ITEM

<ItemInfo>
· · ·
</ItemInfo>
} SECOND ITEM

```
<ClipBoardInfo>
    <ItemInfo>
        <ItmeName>LDEV</ItmeName>
        <ItmeIndex>01:00</ItmeIndex>
        <Capacity>3GB<Capacity>
        <VolumeType>3390-3</VolumeType>
    </ItemInfo>
    <ItemInfo>
        <ItmeName>LDEV</ItmeName>
        <ItmeIndex>01:01</ItmeIndex>
        <Capacity>4GB<Capacity>
        <VolumeType>OPEN-V</VolumeType>
    <ItemInfo>
           ·
           ·
           ·
    <DigestInfo>e01dc2c6f9d1ddad832a45dd5685e56d</DigestInfo >
    <SignatureInfo>O6c74da37c386dffe16ea8c9101fbfd2</SignatureInfo >
</ClipBoardInformation>
```

FIG.14

```
<ClipBoardInfo>
   <ItemInfo>

<SerialNum>00001</SerialNum>
      <ItmeName>LDEV</ItmeName>
      <ItmeIndex>01:00</ItmeIndex>
      <Capacity>3GB<Capacity>
      <VolumeType>3390-3</VolumeType>

</ItemInfo>
   <ItemInfo>

<SerialNum>00001</SerialNum>
      <ItmeName>LDEV</ItmeName>
      <ItmeIndex>01:01</ItmeIndex>
      <Capacity>4GB<Capacity>
      <VolumeType>3390-3</VolumeType>

<ItemInfo>

<DigestInfo>e01dc2c6f9d1ddad832a45dd5685e56d</DigestInfo >
   <SignatureInfo>O6c74da37c386dffe16ea8c9101fbfd2</SignatureInfo >
</ClipBoardInformation>
```

136

STORAGE SYSTEM AND STORAGE SYSTEM MANAGEMENT METHOD

CROSS-REFERENCE TO RELATED APPLICATIONS

This application relates to and claims priority from Japanese Patent Application No. 2007-267054, filed on Oct. 12, 2007, the entire disclosure of which is incorporated herein by reference.

BACKGROUND

1. Field of the Invention

The invention relates to a storage system and a storage system management method, and it is particularly suitable for a storage system and storage system management method for preventing data from being tampered with, and for preventing operation mistakes, when sending and receiving data between software.

2. Description of Related Art

Old model storage devices, late model storage devices, and external storage devices connected to a storage device, are all known storage devices. Furthermore, each storage device has various models, from entry models to high-end models, and these models respectively have different functions. A storage system is configured with different models by arranging the right device in the right place in order to make good use of a storage device owned by an operator.

Software for managing respective storage devices exists in such a storage system, and as integrated management software, a GUI (Graphical User Interface), which is used for the general settings between the different models, is provided in order to manage the different models of the storage devices.

This integrated management software can perform only the general settings among different models. Therefore, when performing settings depending on each storage device, it is necessary to manage storage devices individually by using respective screens provided by the respective management software for the storage devices. Thus, communicating and linking information between these differently designed screens remains an issue.

In order to link the content of settings managed on separate screens with each other, there is a known method of sending and receiving data to and from one another via a clipboard. According to this method, data is stored on a clipboard by performing a copy operation, and can be pasted to some other place by performing a paste operation, so that data can be freely sent and received even between different management software.

Incidentally, as a method for setting storage configuration information, a technique for creating a pair of distributed volumes by conducting a series of remote operations from a management server, thereby performing copying between volumes, is known (see JP2005-44199 A).

SUMMARY

However, there are cases where the storage devices are configured via the Internet, etc., so if the content of settings is stored on a clipboard, the content on the clipboard can be tampered with by a third party. Furthermore, since data can be freely sent and received between all management software, an erroneous send/receive operation may be authorized.

In managing a large number of storage devices, there is the risk that an operator may make a mistake with settings between the GUI screens for the storage devices. If such an operation mistake occurs, there is the possibility that data that is important to the operator may be lost from the storage device, so such a possibility should be avoided.

The present invention has been devised in consideration of the above-described points, and it is and object of the present invention to provide a storage system and a storage system management method capable of preventing data from being tampered with, and of preventing operation mistakes, when sending and receiving data between management software managing storage devices.

According to an aspect of the invention, a storage system includes a plurality of storage devices and a management console that manages the plurality of storage devices, wherein the management console includes: a plurality of storage managers managing each of the plurality of storage devices; a display unit showing information managed in the storage manager; and a data holding unit, when moving predetermined information of the information shown on the display unit by means of a first storage manager that manages one storage device of the plurality of storage devices to a second storage manager that manages other storage devices, the data holding unit holds the predetermined information, and wherein the plurality of storage devices keep a first key for the respective storage devices to encrypt data, and keep a second key for decrypting data encrypted with the first key in another storage device, a controller executing processing for encrypting the predetermined information by using the first key managed by the first manager when temporarily holding the predetermined information in the data holding unit; while decrypting the predetermined information encrypted with the second key kept in a storage device that is managed by the second storage manager when moving the encrypted predetermined information to the second storage manager; and arranging the predetermined information in the second manager based on the decryption result.

According to the invention, it is possible to provide a storage system and a storage system management method capable of preventing data from being tampered with, and of preventing operation mistakes, when sending and receiving data between management software managing storage devices.

Other aspects and advantages of the invention will be apparent from the following description and the appended claims.

BRIEF DESCRIPTION OF THE DRAWINGS

FIG. 4 is a diagram showing an example of information when information stored on a clipboard is pasted on a GUI screen of copy destination storage management console software according to the first embodiment of the invention.

FIG. 5 is a diagram for illustrating that a plurality of item information can be stored on a clipboard according to the first embodiment of the invention.

FIG. 12 is a diagram showing information that has been copied to a clipboard according to the first embodiment of the invention.

FIG. 14 is a diagram showing information that has been copied to a clipboard according to the first embodiment of the invention.

DETAILED DESCRIPTION OF PREFERRED EMBODIMENTS

An embodiment of the present invention will be described below with reference to the attached drawings.

First Embodiment

Figure 1:
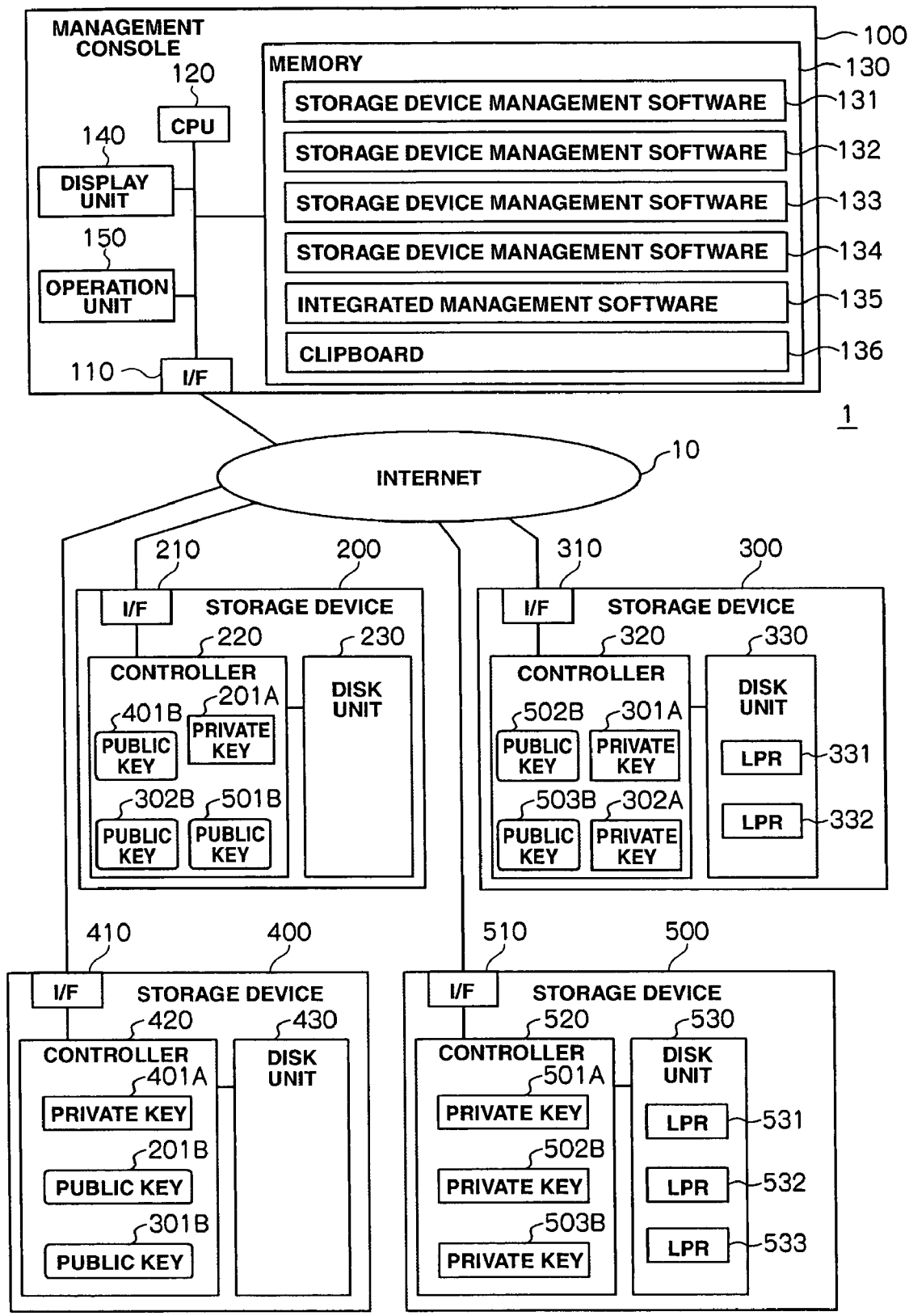
FIG. 1 is a diagram showing the configuration of a storage system according to the first embodiment of the invention.

FIG. 1 is a diagram schematically showing the configuration of a storage system 1. As shown in FIG. 1, the storage system 1 includes a management console 100, storage devices 200, 300, 400 and 500. The management console 100 and the storage devices 200, 300, 400 and 500 are interconnected via an internet 10 and are capable of communicating with one another. While the management console 100, the storage devices 200, 300, 400 and 500 are interconnected via the internet 10 in this embodiment, a LAN (Local Aria Network) or any network capable of communicating may be used in place of the internet 10.

The management console 100 is a device managing the storage devices included in the storage system 1. The management console 100, in the first embodiment, manages the storage device 200, 300, 400 and 500. Also, the management console 100 includes an interface (I/F) 110, a CPU (Central Processing Unit) 120, memory 130, a display unit 140 and an operation unit 150, etc. The CPU 120 manages the storage devices 200, 300, 400 and 500, by executing various kinds of software stored in the memory 130. The memory 130 has an area for holding information to be stored in various kinds of software 131-135 and a clipboard 136. The interface 110 controls communications via the internet 10 performed between the storage devices 200, 300, 400 and 500. The display unit 140 shows messages necessary for an operator of the management console 100. The operation unit 150 is, for example, a keyboard, and accepts operations from the operator of the management console 100.

Various kinds of software stored in the memory 130 are, storage device the management software 131-134 and integrated management software 135, etc. The storage device management software 131-134 respectively are software for managing configuration information, etc. received from the GUI screens of the storage devices 200-500. The configuration information described herein includes information, such as configuration information on volumes or configuration information on a pair of volumes, etc. Furthermore, the integrated management software 135 is software for managing a common part the storage device management software 131-134 are capable of managing in common. The storage device management software 131-134, and the integrated management software 135 show, when being logged into, the GUI screen on the display unit 140, and accept various kinds of operations via the shown GUI screen. The storage device management software 131-134 respectively show different GUI screens, in order to perform management suitable for the respective functions of the storage devices 200-500 each storage device management software manages.

Next, the clipboard 136 will be described below. The clipboard 136 is an area in the memory 130 for temporarily storing data that is copied or cut in an OS (Operation System) such as Windows (registered trademark), UNIX (registered trademark). The operator of the management console 100 specifies target character strings or images on the GUI screen, and copies or cuts them by operating the operation unit 150, so that the target character strings or images are temporarily stored in this area. Then, the operator performs a paste operation using the operation unit 150, and the character strings or images temporarily stored in this area appear in the specified location on the GUI screen. Data that is once registered in the clipboard 136 will be stored until other data is registered, so the same data can be pasted to other locations any number of times. Normally, only one piece of data can be stored on the clipboard 136, so there is utility software for expanding the clipboard 136 so that a plurality of data can be stored on the clipboard 136.

Figure 2:
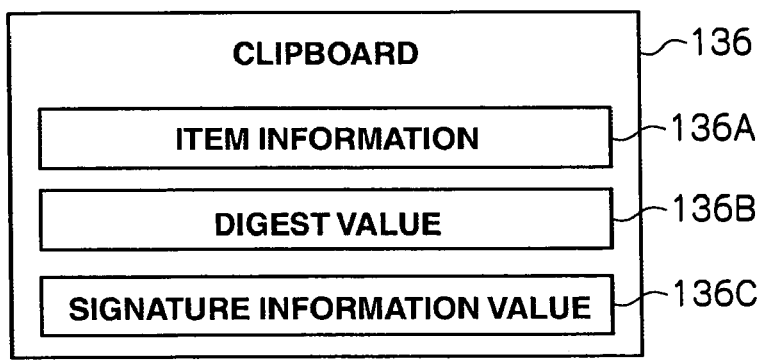
FIG. 2 is a diagram showing an example of a clipboard according to the first embodiment of the invention.

In the first embodiment, when a copy operation is performed on an item on the GUI screen, item information, the value of the digest of the item information, and a signature information value are stored on the clipboard 136 all together as one piece of information. FIG. 2 is a diagram showing an example of the clipboard 136. As shown in FIG. 2, item information 136A, a digest value 136B and a signature information value 136C are stored on the clipboard 136 all together as one piece of information.

Figure 3:
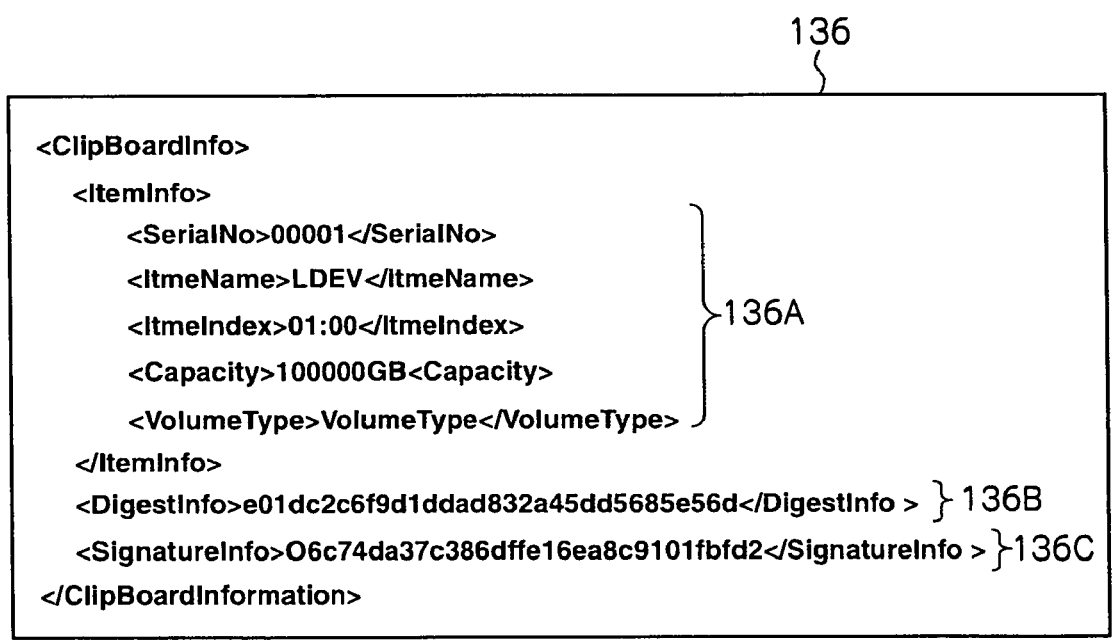
FIG. 3 is a diagram showing a specific example of information stored on a clipboard according the first embodiment of the invention.

FIG. 3 is a diagram showing a specific example of information stored on the clipboard 136. FIG. 3 shows information stored on the clipboard 136 in xml document format. In the memory 130, the area of the clipboard 136 is represented in an area bounded by "<ClipBoardInfo>" and "</ClipBoardInfomation>." Also, item information is stored in an area bounded by "<Iteminfo>" and "<Iteminfo>." In an area bounded by "<Iteminfo>" and "<Iteminfo>," for example, a serial number, information on a volume (the name of an item (LDEV (Logical Device)), the capacity of an item (100000 GB), the volume type (the attribute of a volume), and an item index are stored. The value of the digest is stored in an area bounded by "<Digestinfo>" and "<Digestinfo>." As the value of the digest, for example, "e01dc2c6f9d1ddad832a45dd5685e56d" is stored. The signature information value is stored in an area bounded by "<SinnatureInfo>" and "<SinnatureInfo>." As the signature information value, for example, "06c74da37c386dffe16ea8c9101fbfd2" is stored. Thus, the item information 136A, the digest value 136B and the signature information value 136C are stored as character string information in the clipboard 136. Incidentally, processing for generating the digest value 136B and the signature information value 136C will be described later below.

When copying, as shown in FIG. 3, the item information 136A, the digest value 136B and the signature information value 136C are stored on the clipboard 136. Also, when pasting, the content stored on the clipboard 136 is transferred to the paste destination storage device management software. When a copy operation is performed, information previously stored on the clipboard 136 is overwritten by new information, so the very last information is valid information FIG. 4 is a diagram showing an example of information when information stored on the clipboard 136 is pasted on the GUI screen of copy destination storage management console software. A serial number, the name of an item, the capacity, the volume type and information on item index, which are the item information stored on the clipboard 136 described with reference to FIG. 3, are pasted to a copy destination.

Furthermore, as shown in FIG. 5, it is possible to arrange a plurality of item information to be stored on the clipboard 136, for example, by specifying themas the first item information, the second item information and so on. When storing a plurality of item information in the clipboard 136 in that way, it is possible to generate a value of a digest relative to each of a plurality of item information, and also it is possible to generate one digest value relative to a plurality of item information. In the first embodiment, one digest value is generated relative to a plurality of item information.

Information stored on the clipboard 136 is character string information, so the information can be checked visually by pasting it in a text editor such as a memo-pad, word processor software, or spreadsheet software. Consequently, information stored on the clipboard 136 can be referred to by using software other than the storage device management software 131-134.

Next, the storage device 200 will be described below. The storage device 200 includes an interface (I/F) 210, a controller 220 and a disk unit 230. The interface 210 controls communication via the internet 10 between the storage device 200 and the management console 100, the storage device 300, 400 or 500. The controller 220 includes: a channel adaptor controlling sending and receiving data to and from a host system; a disk adaptor controlling sending and receiving data to and from the disk unit 230; and memory such as cache memory for temporarily holding data, and shared memory for holding various kinds of tables or configuration information, etc. Also, the controller 220 performs overall control of the storage device 200. The disk unit 230 has a plurality of hard disk drives, and holds data.

The memory 130 of the controller 220 holds a private key 201A and public keys 302B, 401B, 501B. Private keys are used in encrypting data, and public keys are used in decrypting data encrypted with private keys. Private keys and public keys correspond one-to-one with each other, and data encrypted with the private key cannot be decrypted with any public keys other than a public key that corresponds to the private key. The private key 201A is a key used for encrypting data in the storage device 200. The public key 302B is a public key used for decrypting data encrypted with the private key 302A and set in an LPR (Logical Partition) 332 of the storage device 300. The public key 401B is a public key used for decrypting data encrypted with the private key 401A and set in the storage device 400. The public key 501B is a public key used for decrypting data encrypted with the private key 501A and set in an LPR531 of the storage device 500. Furthermore, the controller 220 holds a key generation program for generating the private key 201A and the public key 201B decrypting data encrypted with the private key 201A; and a signature program for appending a signature to data by using the private key 201A.

Next, the storage device 300 will be described. The storage device 300 includes an interface (I/F) 310, a controller 320 and a disk unit 330. The interface 310 controls communications via the internet 10 between the storage device 300 and the management console 100, the storage device 200, 400 or 500. The controller 320 includes: a channel adaptor controlling sending and receiving data to and from a host system; a disk adaptor controlling sending and receiving data to and from the disk unit 330; and memory such as cache memory for temporarily holding data, and shared memory for holding various kinds of tables or configuration information, etc. Also, the controller 320 performs overall control of the storage device 300. The disk unit 330 has a plurality of hard disk drives, and holds data.

A memory area of the disk unit 330 is divided into two memory areas namely, LPR331, 332. Thus, the storage device 300 is set so that the management console 100, and the storage devices 200, 400 and 500 recognize that two storage devices exist. Therefore, two private keys are kept in the memory of the controller 320, such as a private key 301A which corresponds to the LPR331 and a private key 302A which corresponds to the LPR332. The private key 301A is a key used for encrypting data of the LPR331. The private key 302A is a key used for encrypting data of the LPR332. Furthermore, public keys 502B, 503B are also kept in the controller 320. The public key 502B is a public key for decrypting data encrypted with the private key 502A and set in an LPR532 of the storage device 500. The public key 503B is a public key for decrypting data encrypted with the private key 503A and set in an LPR533 of the storage device 500. Moreover, the controller 320 holds a key generation program for generating the private key 301A, the public key 301B, the private key 302A and the public key 302B respectively; and a signature program for appending a signature to data by using the private keys 301A, 302A.

Next, the storage device 400 will be described. The storage device 400 includes an interface (I/F) 410, a controller 420 and a disk unit 430. The interface 410 controls communications via the internet 10 between the storage device 400 and the management console 100, the storage device 200, 300 or 500. The controller 420 includes: a channel adaptor controlling sending and receiving data to and from a host system; a disk adaptor controlling sending and receiving data to and from the disk unit 430; and memory such as cache memory temporarily for holding data, and shared memory for temporarily holding various kinds of tables or configuration information, etc. Also, the controller 420 performs overall control of the storage device 400. The disk unit 430 has a plurality of hard disk drives, and holds data. A private key 401A, public keys 201B, 301B are kept in the memory of the controller 420. The private key 401A is a key used for encrypting data in the storage device 400. The public key 201B is a public key for decrypting data encrypted with the private key 201A and set in the storage device 200. The public key 301B is a public key for decrypting data encrypted with the private key 301A and set in the LPR331 of the storage device 300. Furthermore, the controller 420 holds a key generation program for generating the private key 401A and the public key 402B; and a signature program for appending a signature to data by using the private key 401A.

Next, the storage device 500 will be described. The storage device 500 includes an interface (I/F) 510, a controller 520 and a disk unit 530. The interface 510 controls communications via the internet 10 between the storage device 500 and the management console 100, the storage device 200, 300 or 400. The controller 520 includes: a channel adaptor controlling sending and receiving data to and from a host system; a disk adaptor controlling sending and receiving data to and from the disk unit 530; and memory such as cache memory temporarily for holding data, and shared memory for temporarily holding various kinds of tables or configuration information, etc. Also, the controller 520 performs overall control of the storage device 500. The disk unit 530 has a plurality of hard disk drives, and holds data.

A memory area of the disk unit 530 is divided into three memory areas namely, LPR531, 532 and 533. Thus, the storage device 500 is set so that the management console 100, and the storage devices 200, 300 and 400 recognize that three storage devices exist. Therefore, three private keys are kept in the memory of the controller 520, such as a private key 501A that corresponds to the LPR531 and a private key 502A that corresponds to the LPR532, and a private key 503A that corresponds to the LPR533. The private key 501A is a key used for encrypting data of the LPR531. The private key 502A is a key used for encrypting data of the LPR532. The private key 503A is a key used for encrypting data of the LPR533. Furthermore, the controller 520 holds a key generation program for generating the private key 501A and the public key 501B, the private key 502A and the public key 502B, the private key 503A and the public key 503B; and a signature program for appending a signature to data by using the private keys 501A, 502A, 503A.

Next, designing a system policy in the storage system 1 will be described. The system policy is configured by an administrator of the storage system 1 by determining how and in which storage device in the storage system a public key is arranged.

Figure 6:
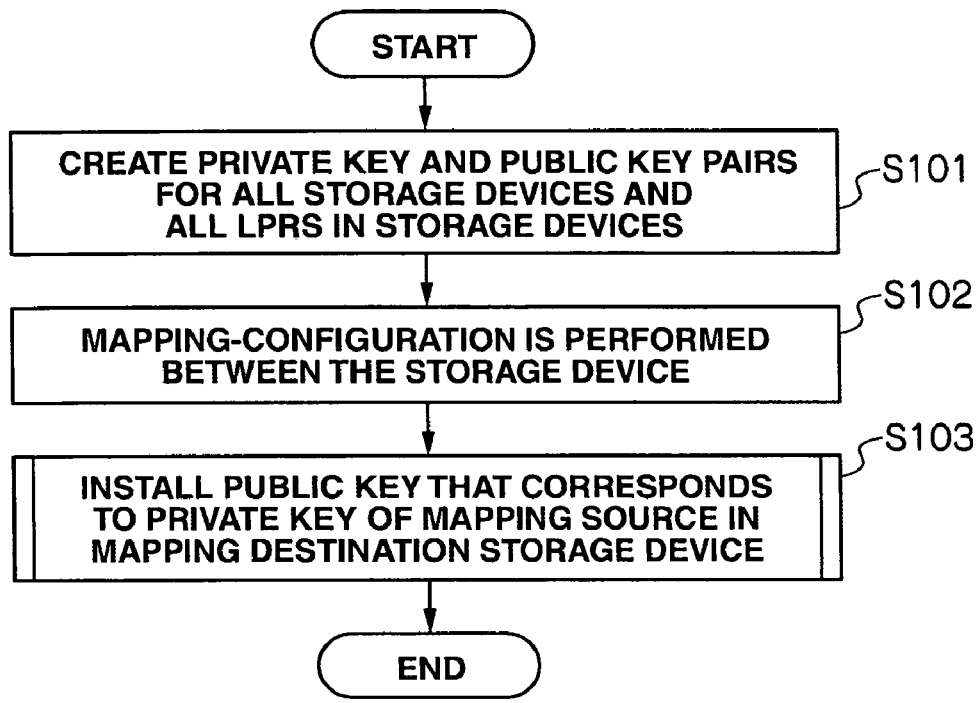
FIG. 6 is a flowchart illustrating system policy design processing according to the first embodiment of the invention.

FIG. 6 is a flowchart illustrating system policy design processing. This processing is executed by the CPU 110 of the management console 100 in response to an operation of the administrator of the storage system 1.

Figure 8:
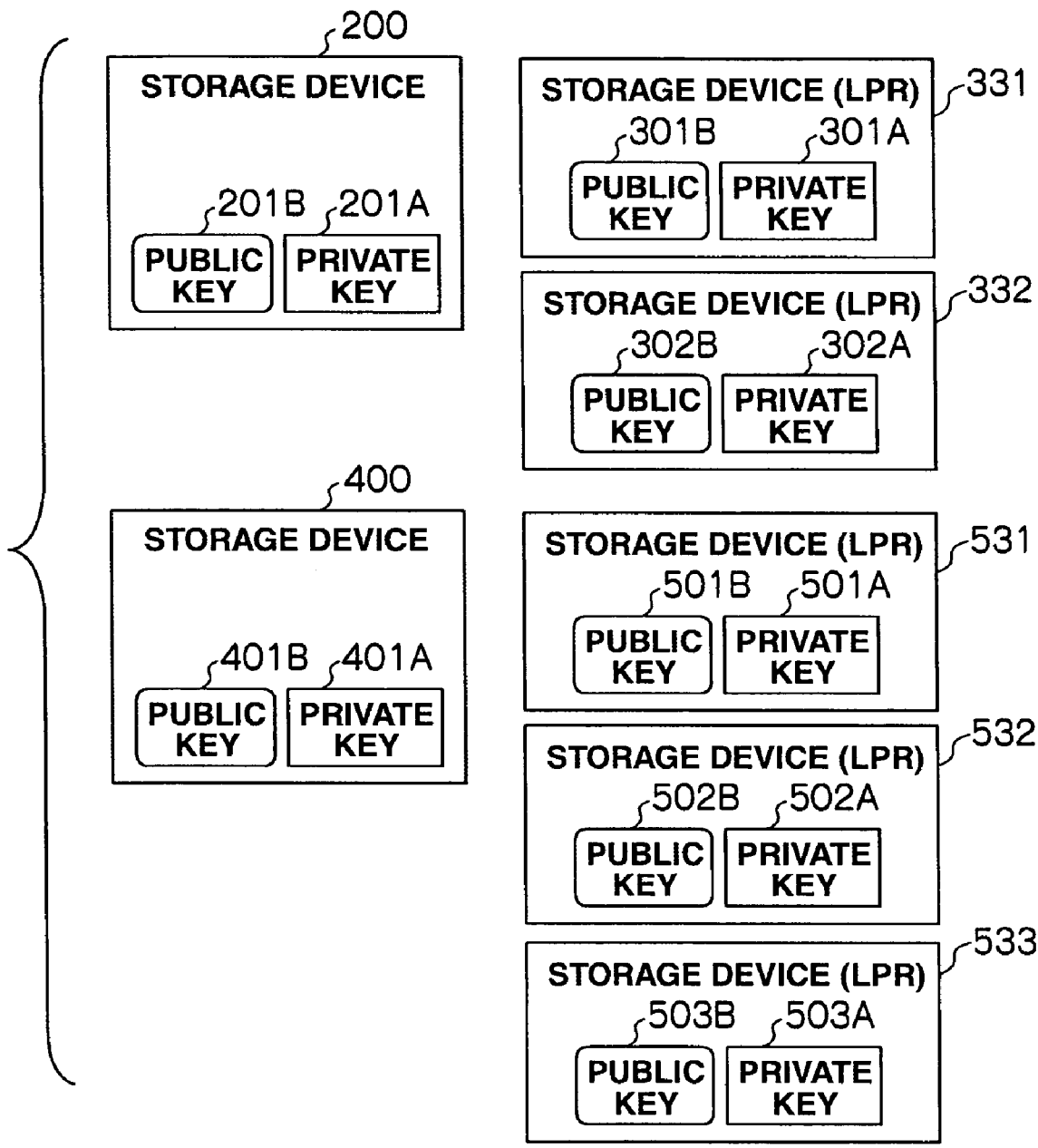
FIG. 8 is a diagram showing a state in which a private key and public key pair have been generated according to the first embodiment of the invention.

In step S101, private key and a public key pairs are generated with respect to all storage devices in the storage system 1 and all LPRs of a storage. FIG. 8 is a diagram showing the state in which private key and a public key pairs are generated with respect to all storage devices in the storage system 1 and all LPRs of a storage. The private key 201 and the public key 201B, the private key 401A and the public key 401B, the private key 301A and the public key 301B, the private key 302A and the public key 302B, the private key 501A and the public key 501B, the private key 502A and the public key 502B, and the private key 503A and the public key 503B are respectively set with respect to each of the storage devices 200, 400 and each of the LPR331, 332, 531, 532 and 533 in the storage device. These pairs of private keys and public keys are generated, in accordance with instructions from the management console 100, by executing respective key programs in the controllers 220 to 520 in the storage device 200-500.

A key generation program automatically generates a a private key and a public key pair by combining uniquely defined information such as a production device number corresponding to each storage device, etc., with a random number. Then, the private keys are stored in the respective controllers, and are set so that any programs other than internal programs cannot be accessed to the private key. Also, the public keys can be downloaded from the storage management software, and set so that an operator who can log-in to the storage system 1 is able to obtain the public key.

Next, in step S102, mapping-configuration is performed between the storage device and the LPR of the storage device. The storage devices 200, 400 or the LPRs 331, 332, 531, 532 and 533 of the storage device are connected to the other storage devices 200, 400, and the LPR331, 332, 531, 532 and 533 of the storage device, by the administrator, using arrows. These arrows are designed to indicate that the public key moves from the storage device at the tail of arrow to the storage device at the head of arrow.

Figure 9:
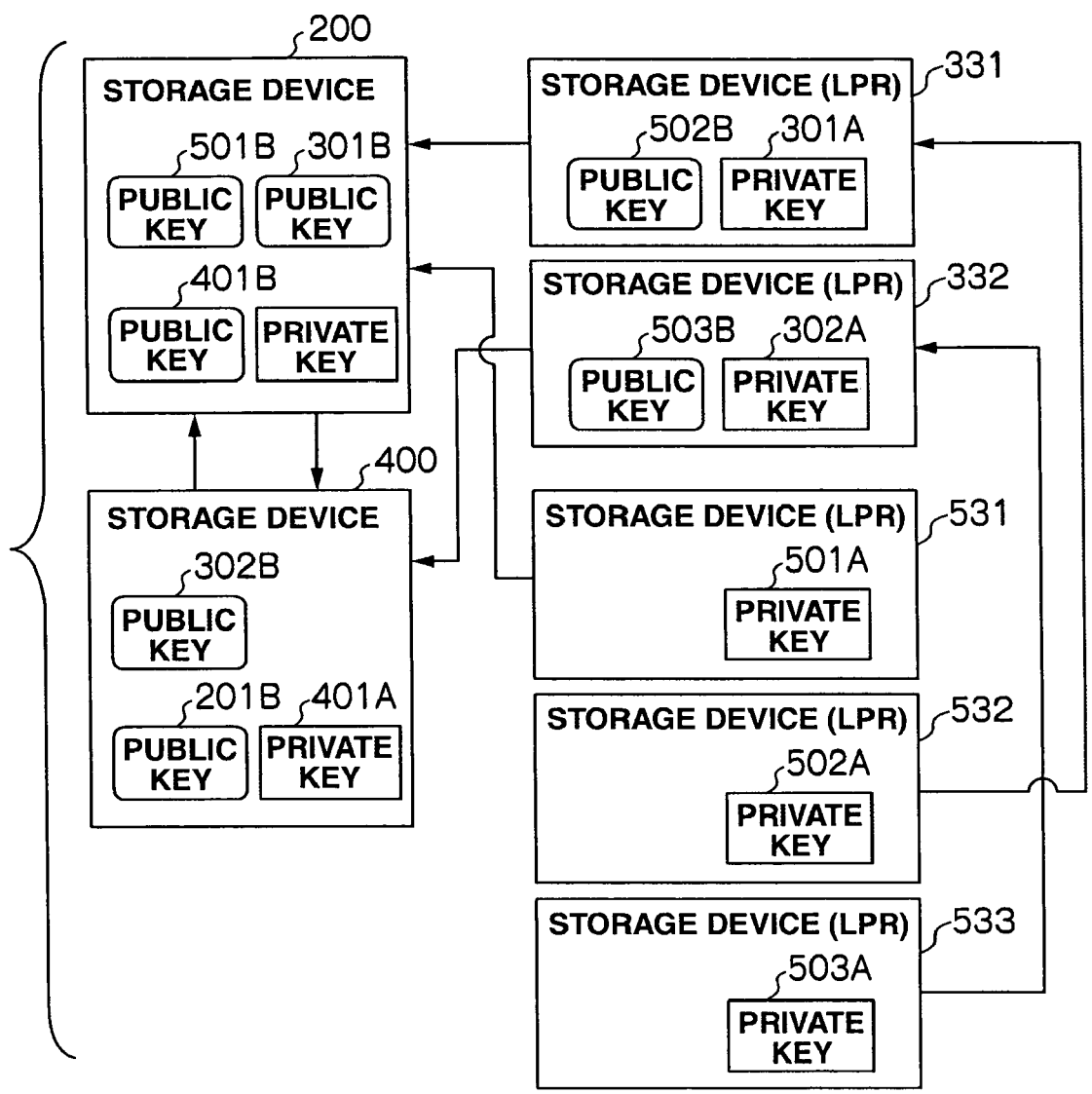
FIG. 9 is a diagram showing a state in which mapping-configuration has been performed on the status shown in FIG. 8.

FIG. 9 is a diagram showing the state in which mapping-configuration was performed on the status shown in FIG. 8. As shown in FIG. 9, an arrow connects the storage device 100 to the storage device 300. Also, arrows connect the storage device 300 to an LPR, and the LPR to the storage device 100 respectively. Furthermore, an arrow connects the LPR to the storage device 300. Moreover, arrows connect the LPR to an LPR, and the LPR to the LPR respectively. The public key moves in accordance with these arrow connections. Specifically, the public keys 401B, 501B move to the storage device 200, the public key 502B moves to the LPR331 of the storage device 300, the public key 503B moves to the LPR332 of the storage device 300, the public key 201B and the public key 302B moves to the storage device 400.

The statuses shown in FIGS. 8 and 9 are, for example, shown on the display unit 140 of the management console 100, and are checked visually by the administrator. Also, the connection using arrows shown in FIG. 9 is performed using the operation unit 150 while the administrator checks visually what is shown on the display unit 140.

Then, in step S103, a public key that corresponds to the mapping source private key is installed in the mapping destination storage device, based on the mapping-configuration, so that the public key is set in the storage device or the LPR. The details of this processing will be described later below with reference to FIG. 7.

Figure 7:
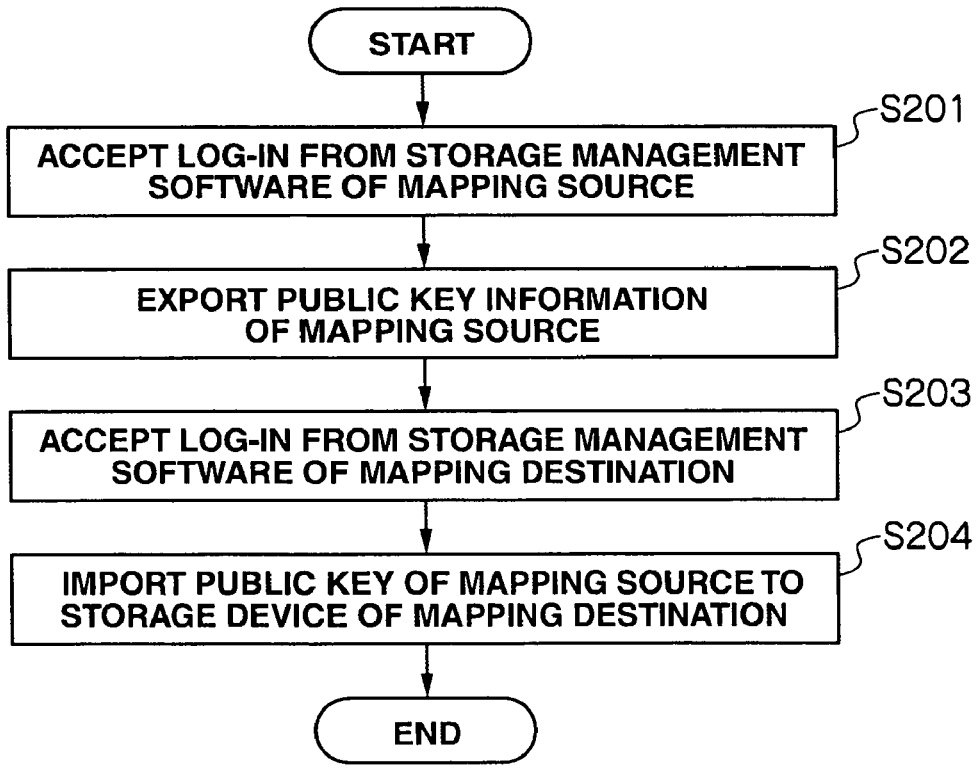
FIG. 7 is a flowchart illustrating install processing of a public key according to the first embodiment of the invention.

Next, the details of steps for installing public keys will be described. The administrator of the storage system operates the management console 100 to perform installing public keys in the respective storage devices, after finishing designing the above-described system policy. FIG. 7 is a flowchart illustrating installation processing for a public key, which the CPU executes in response to an operation in the operation unit 150.

First, in step S201, the CPU 120 receives the log-in of the mapping source storage device management software; and in step S202, the CPU 120 executes the storage device management software, and exports any public key of the storage device 200, 400, the LPR331, 332, 531, 532 or 533. Information on the exported public key is kept in the memory 130 of the management console 100. For example, when the storage device 200 is the mapping source, the log-in of the storage device management software 131 is accepted, the public key 201B of the storage device 200 is exported, and the public key 201B is kept in the memory 130.

Then, in step S203, the CPU 120 accepts the log-in of the mapping source storage device management software; and in step S204, the CPU 120 executes the storage device management software, and exports the public key kept in the memory 130 to the mapping destination storage device. Thus, the public key is kept in the controller of the storage device. For example, if the storage device 400 is the mapping destination, the log-in of the storage device management software 132 is accepted, the public key 201B kept in the memory 130 is exported to the storage device 400.

Public keys are arranged as shown in the respective storage devices 200-500 of the storage system 1 shown in FIG. 1 by performing these steps on all storage devices arranged based on the system policy.

When generating keys, as a specific example, an RSA public key system will be employed. Also, as a well-known technique, for example, a program for generating a public key using the java language is provided, so here, a pair of public keys will be generated using that program. The management console 100 executes the command "Keytool-Keypasswprdalias duke-keypass dukekeypass-new newpass," so that a a private key and a public key pair is generated. Also, the management console 100 executes the command "Keytool export-alias duke-file janecertfile cer," so that only information on the public key can be retrieved from the the private key and the public key pair, which is generated in the above-described manner. Then, using the retrieved information on the public key, the public key is exported to and kept in the copy destination storage device.

Figure 10:
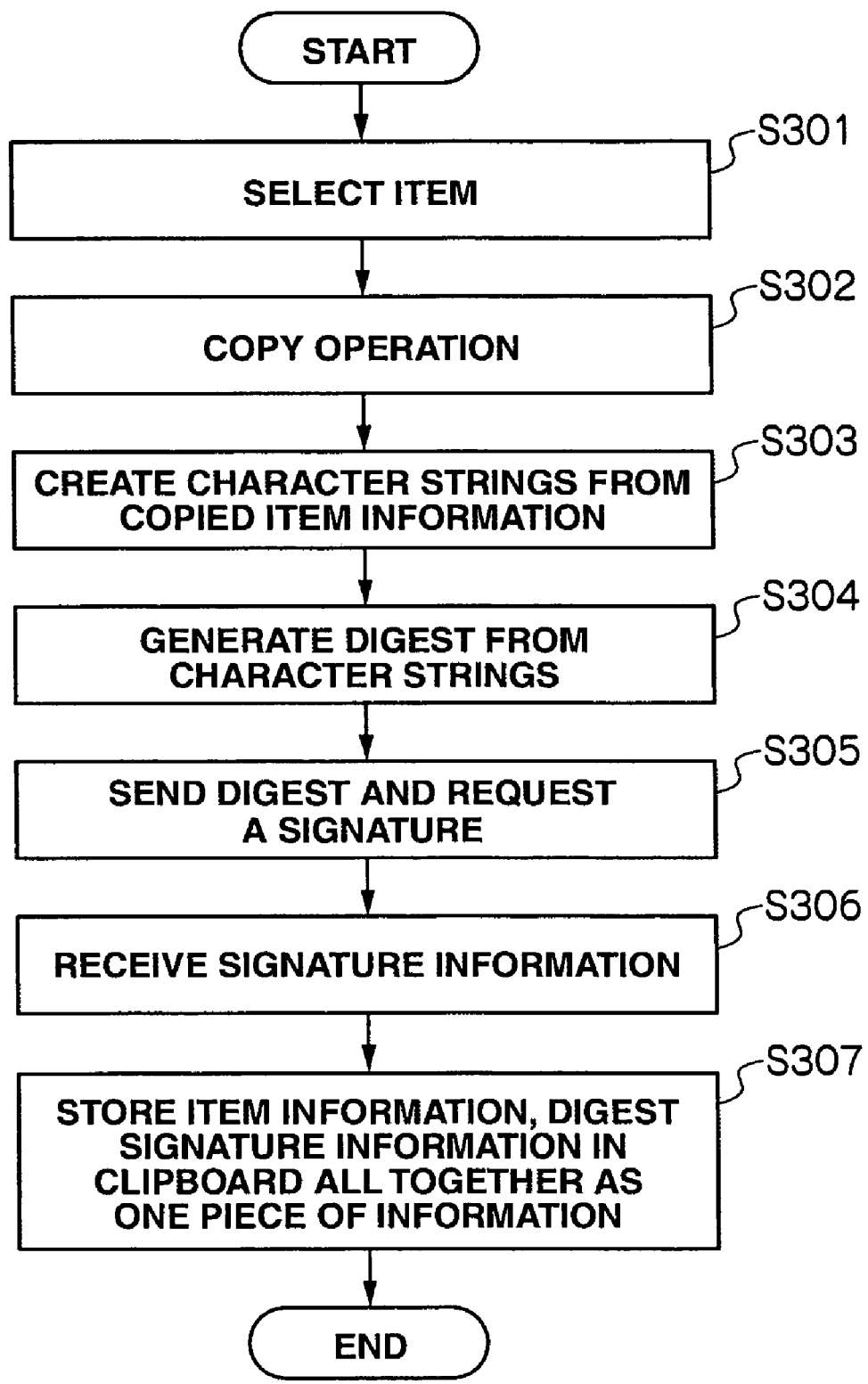
FIG. 10 is a flowchart illustrating processing of copy source storage device management software according to the first embodiment of the invention.
Figure 11:
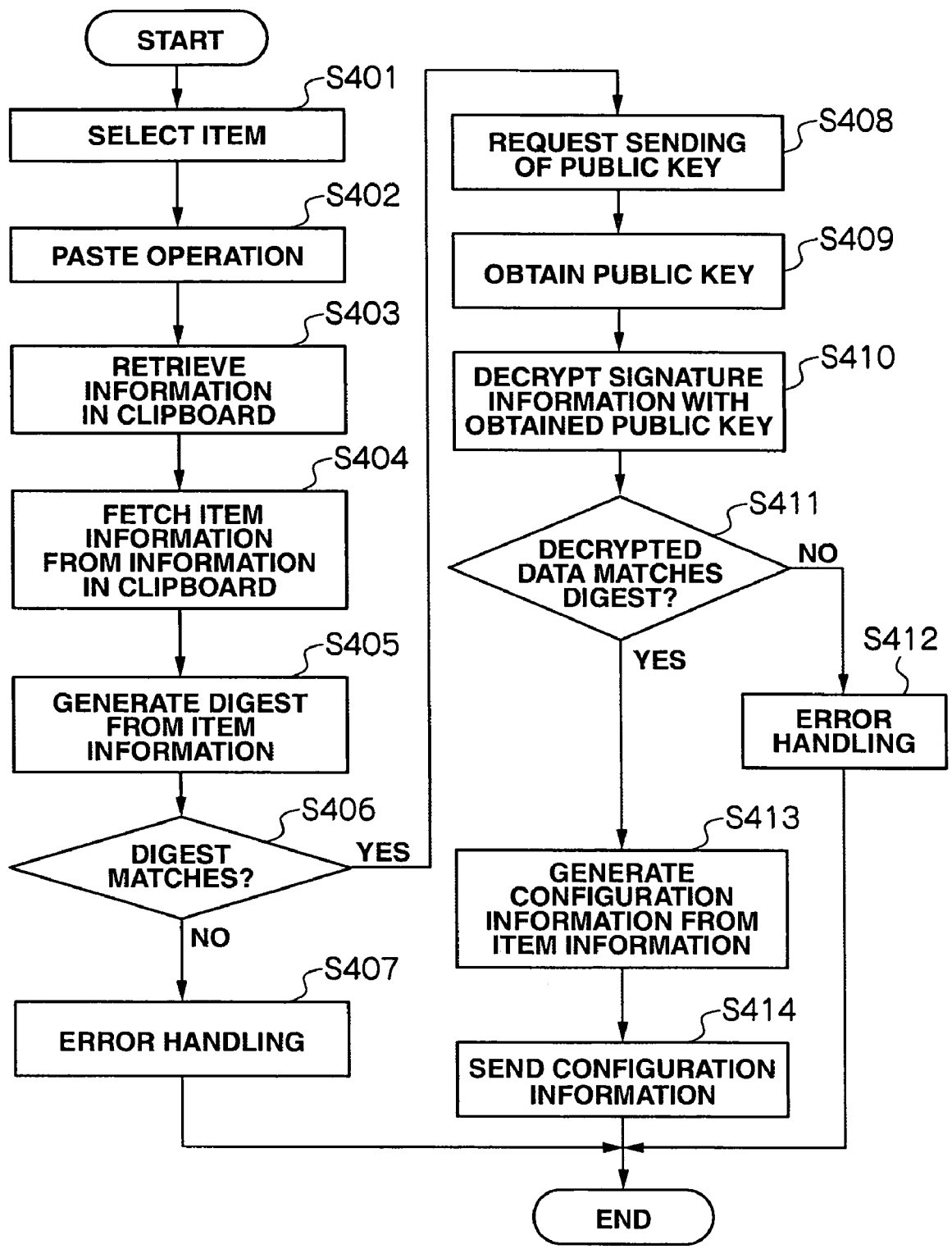
FIG. 11 is a flowchart illustrating processing of copy destination storage device management software according to the first embodiment of the invention.

Next, processing when the CPU 120 of the management console 100 copies item information using the clipboard 136 will be described. FIG. 10 is a flowchart illustrating processing of copy source storage device management software, in which the CPU 120 executes the storage device management software. Also, FIG. 11 is a flowchart illustrating processing of copy destination storage device management software, in which the CPU 120 executes the storage device management software.

First, processing of the copy source storage device management software will be described below with reference to FIG. 10. In step S301, the CPU 120 selects an item. This selection is made based on the selection made by the operator and shown on the GUI screen. The "item" indicates a physical hardware component of a storage device, such as a parity group or a port, etc. shown by the GUI; or something logically defined in a storage device, such as an LDEV or an LU (Logical Unit), etc. Also, there are various kinds of GUI screens, such as a screen showing a configuration of a volume size or an attribute, or a screen showing a configuration for remote copying, etc. These respective GUI screens have a different layout for each storage device management software 131-134.

In step S302, the CPU 120 accepts a copy operation. For example, the operator performs a predetermined operation in the operation unit 150 of the management console 100, so that the display unit 140 shows a pop-up menu, then the operator selects "copy" from the pop-up menu. Based on these operations, the CPU 120 accepts the copy operation of the item which is selected in step S301.

In step S303, when the CPU 120 accepts the copy operation, it creates the item information (the character string information) based on the item whose copy operation is accepted. The character string information is, for example, "Item=Parity Group No=1-1 Capacity=10000 GB".

In step S304, the CPU 120 generates the digest (MD5) of the character string information created in step S304. When the character string information is "Item=Parity Group No=1-1 Capacity=10000 GB" as described above, the digest of the character string information will be "e01dc2c6f9d1ddad832a45dd5685e56d". If a different item is selected, a different value of a digest will be generated. In exceptional cases, the same digest may be generated for different items, but the probability of that is one in $16^{32}$.

In step S305, the CPU 120 sends the generated digest to the storage device managed by the copy source storage device management software, and makes a request the storage device to provide a signature. In accordance with this request, the storage device managed by the storage device copy source management software appends a signature to the digest sent using the previously set private key, and executes processing for sending the signature information to the management console 100. For example, when the digest is "e01dc2c6f9d1ddad832a45dd5685e56d," the sent signature information will be "06c74da37c386dffe16ea8c9101fbfd2," This processing for creating signature information is performed in a storage device by executing a signature program.

In step S306, the CPU 120 receives signature information sent from the storage device. Then, in step 307, the CPU 120 stores item information, a digest and the received signature information in the clipboard 136 all together as one piece of information. In the above-described example, a digest and signature information, "Item=Parity Group No=1-1 Capacity=100 GB", "e01dc2c6f9d1ddad832a45dd5685e56d" and "06c74da37c386dffe16ea8c9101fbfd2" are respectively stored on the clipboard 136 as item information. The processing of the copy source storage device management software is terminated by performing the above step S307.

Next, processing of the copy destination storage device management software will be described below with reference to FIG. 11. In step S401, the CPU 120 selects an item. This selection is made based on the selection made by the operator and shown on the GUI screen. The GUI screen in that time is a screen for setting the same configuration information as that of the GUI screen in step S301 when selecting the item.

In step S402, the CPU 120 accepts a paste operation. "Paste" indicates attaching information stored on the clipboard 136 to the item selected in step S401, The operator performs a predetermined operation in the operation unit 150 of the management console 100 in order for the display unit 140 to show a pop-up menu, and then selects "paste" from the pop-up menu. Based on these operations, the CPU 120 accepts the paste operation.

In step S403, the CPU 120 retrieves information on the clipboard 136. More specifically, information including item information, a digest and signature information stored on the clipboard 136 in step S307 is retrieved.

In step S404, the CPU 120 fetches item information from the information retrieved from the clipboard 136. Then, in step S405, the CPU 120 generates a digest based on information on the fetched item, such as "Item=Parity Group No=1-1 Capacity=10000 GB".

Then, In step S406, the CPU 120 judges whether or not the digest previously stored on the clipboard 136 matches the digest generated in step S405. If the digest does not match (S406: NO), it means that there is a possibility that data has been tampered with, so the CPU 120 performs error handling in step S407. The error handling is processing for, for example, showing a message to the operator to indicate that there is the possibility that data has been tampered with; or is processing for stopping pasting.

On the other hand, in step S406, if the CPU 120 judges that the digest matches (S406: YES), the CPU 120, in step S408, requests a public key for the storage device managed by the copy destination storage device management software. The storage device receives the request and sends the public key set in the storage device to the CPU 120.

In step S409, the CPU 120 obtains the public key; and in step S410, the CPU 120 decrypts the signature information "06c74da37c386dffe16ea8c9101fbfd2" retrieved in step S403 by using the obtained public key.

Then in step S411, the CPU 120 judges whether or not the decrypted signature information (namely, the digest) matches the digest retrieved from the clipboard 136. If the digests do not match (S411: NO), it means that there is a possibility that data has been tampered with, so the CPU 120 performs error handling in step S412. The error handling is processing for, for example, showing a message to the operator to indicate that the signature information could not be decrypted with the obtained public key, as well as processing for showing a message to the operator to indicate that there is the possibility that data has been tampered with, or processing for stopping pasting. Depending on the system policy, there may be cases where decryption cannot be performed with an obtained public key.

On the other hand, in step S410, if the CPU 120 judges that the digest matches (S411: YES), the CPU 120 generates, in step S413, configuration information from the item information. The configuration information is, for example, configuration information for creating a pair of volumes while arranging a particular volume of the storage device 200 as a primary volume and a particular volume of the storage device 400 as a secondary volume. This configuration information is determined based on the kind of the GUI screen selected in step S401 and the item information.

In step S414, the CPU 120 sends the generated configuration information to the storage device. When the controller of the storage device receives the configuration information, it executes configuration processing based on the configuration information. For example, when the above-described configuration information is generated, the configuration information is sent to the storage device 200 and the storage device 400, and then the controller 220 of the storage device 200 and the controller 420 of the storage device 400 execute the configuration processing for configuring a pair. Thus, processing of the copy destination storage device management software is performed.

Incidentally, when the configuration processing is finished, processing based on the configuration processing is executed in the storage system 1. For example, as in the above-described example, a pair of a particular primary volume of the storage device 200 and a particular secondary volume of the storage device 400 is configured, and then data copying is performed.

Next, effects in copying item information by using the clipboard 136, in the storage system 1 configured as described above, will be described with reference to two specific examples.

Figure 13:
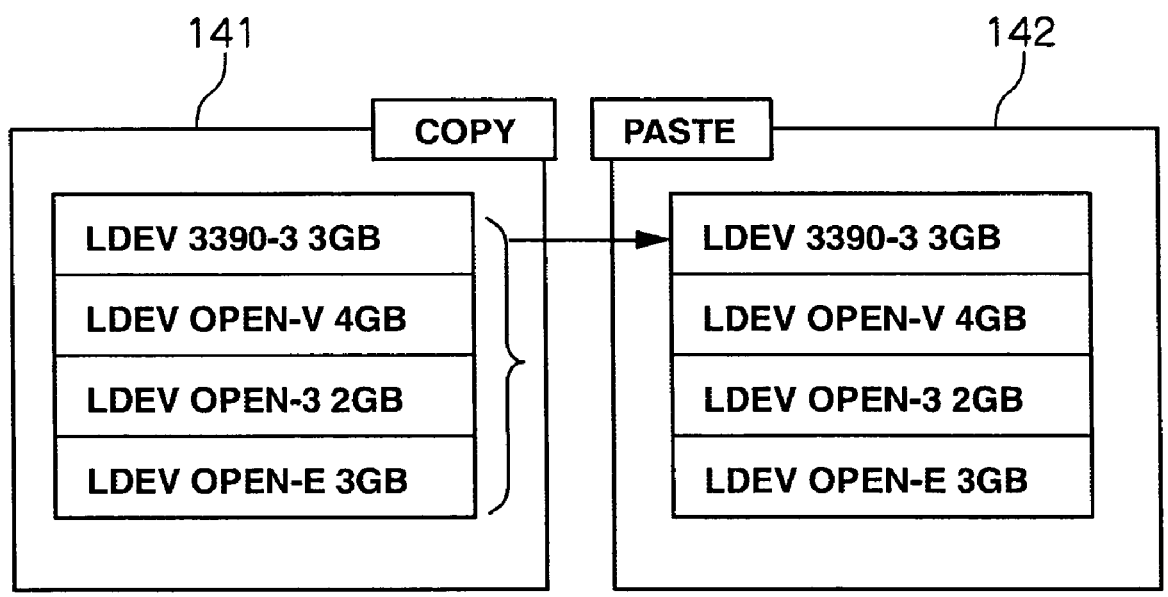
FIG. 13 is a diagram schematically showing a GUI screen according to the first embodiment of the invention.

As the first example, cases creating a new volume, which has the same size and the same attributes as those of the volume of the copy source storage device 200, in the copy destination storage device 400 will be described. FIG. 12 shows information copied on the clipboard 136, and FIG. 13 shows the GUI screen 141 displayed by means of the storage device management software 131 and the GUI screen 142 displayed by means of the storage management software 133. The GUI screens 141, 142 are both screens for creating volumes.

As shown on the left side of FIG. 13, item information is shown in the GUI screen 141 displayed by means of the storage device management software 131. Information on these shown items comprise four pieces of information, namely "LDEV 3390-3 3 GB", "LDEV OPEN-V 4 GB", "LDEV OPEN-3 2 GB" and "LDEV OPEN-E 3 GB".

Thus, when the operator copies the item information shown on the GUI screen 141 by using the operation unit 150 of the management console 100, the processing in step S301 to S307 shown in FIG. 10 is executed. Then, as shown in FIG. 12, together with item information, the value of a digest, and the value of signature information are stored on the clipboard 136. Also as shown in FIG. 12, one digest and one piece of signature information is generated with respect to information on four pieces of item information.

The operator operates pasting on the GUI screen 142, so that the item information stored on the clipboard 136 is pasted. At that time, processing of the steps S401 to S414 as shown in FIG. 11 is performed. The public key 201B for decrypting data encrypted with the private key 201A of the storage device 200 is arranged in the storage device 400 managed by the storage device management software 133, and if item information stored on the clipboard 136 has not been tampered with, configuration information can be set in the storage device management software 133 based on information on the pasted item and the kind of GUI screen 142 showing the pasted item. When it is not possible to retrieve the public key that corresponds to the private key set in the copy source storage device, or when data has been tampered with, an error message will be shown on the display unit 140.

The right side of FIG. 13 shows the GUI screen 142 on which the item information is so pasted. Information on the pasted items are four pieces of information, namely "LDEV 3390-3 3 GB", "LDEV OPEN-V 4 GB", "LDEV OPEN-3 2 GB" and "LDEV OPEN-E 3 GB". Specifically, information on the same items as those shown on the GUI screen 141 of the storage device management software 131 are shown. More specifically, a volume having the same size and the same attribute is created in the storage device management software 133.

Figure 15:
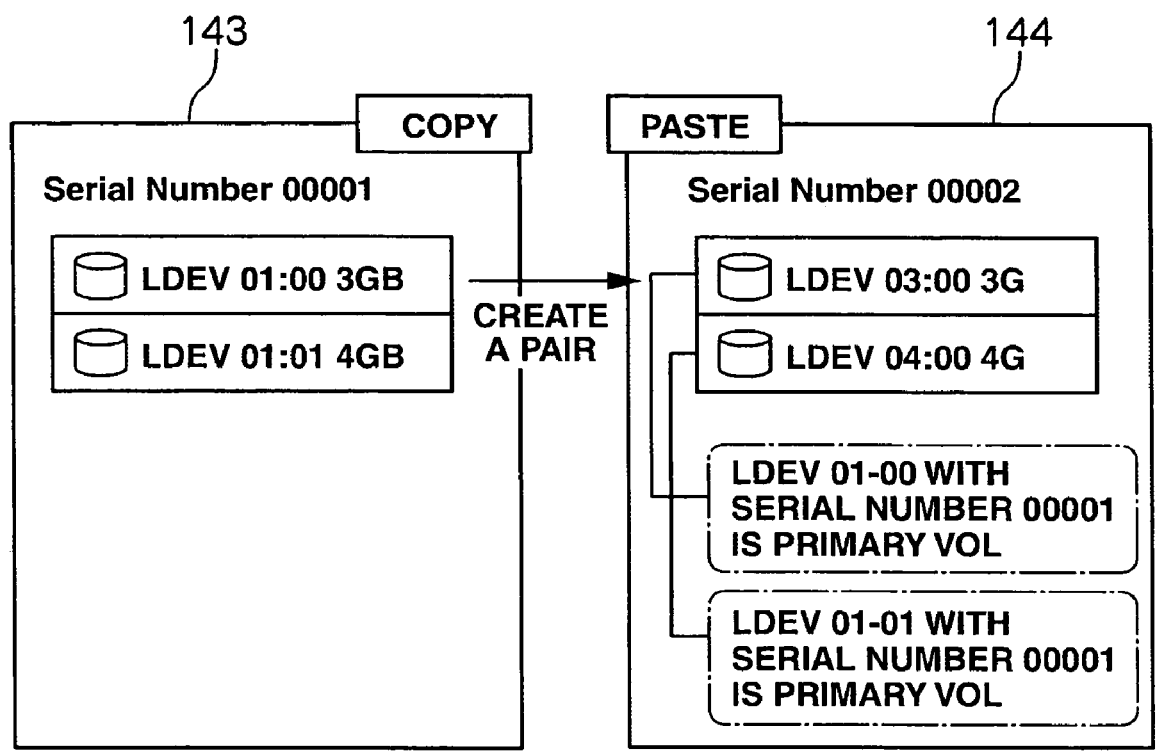
FIG. 15 is a diagram schematically showing a GUI screen according to the first embodiment of the invention.

Next, as the second example, cases creating a pair of remote copy, while arranging the volume of the copy source storage device 200 as a primary volume and the volume of the copy destination storage device 400 as a secondary volume, will be described. FIG. 14 shows information copied to the clipboard 136, and FIG. 15 shows the GUI screen 143 displayed by means of the storage device management software 131 and the GUI screen 144 displayed by means of the storage management software 133. The GUI screens 143, 144 are both screens for creating volumes.

As shown on the left side of FIG. 15, item information is shown in the GUI screen 143 displayed by means of the storage device management software 131. Information on these shown items comprises two pieces of information, namely "LDEV 01:00 3 GB" and "LDEV 01:01 4 GB".

Thus, when the operator copies the item information shown in the GUI screen 143 by using the operation unit 150 of the management console 100, the processing in step S301 to S307 shown in FIG. 10 is executed. Then, as shown in FIG. 14, together with item information, the value of a digest, and the value of signature information is stored on the clipboard 136. Also as shown in FIG. 14, one digest and one piece of signature information have been generated with respect to information on two pieces of item information.

The operator operates pasting on the GUI screen 142, so that the item information stored on the clipboard 136 is pasted. At that time, the processing in steps S401 to S414 as shown in FIG. 11 is performed the public key 201B for decrypting data encrypted with the private key 201A of the storage device 200 is arranged in the storage device 400 managed by the storage device management software 133, and if item information stored on the clipboard 136 has not been tampered with, configuration information can be set in the storage device management software 133 based on information on the pasted item and the kind of GUI screen 144 showing the pasted item. When it is not possible to retrieve the public key that corresponds to the private key set in the copy source storage device, or when data has been tampered with, an error message will be shown on the display unit 140.

The right side of FIG. 15 shows the GUI screen 144 on which the item information is so pasted. Information on the pasted items are, namely "LDEV 03:00 3 GB" and "LDEV 04:00 4 GB". Furthermore, the configuration information determined based on the copied item information and the kind of GUI screen 144 indicates that, "LDEV 03:00 3 GB" means "LDEV 01:00 3 GB" with the serial number 00001 is a primary volume; and "LDEV 04:00 4 GB" means "LDEV 01:01 4 GB" with serial number 00001 is a primary volume.

According to the storage system 1 in the first embodiment, when copying and pasting item information between the storage device management software 131-134 managing the storage devices 200-500 by means of the clipboard 136, item information can be prevented from being tampered with by: appending the digest of item information using a private key set in the copy source storage device; storing this information in the clipboard; decrypting signature information using a public key retrieved from the copy destination storage device; comparing the value of a digest and the value of signature information with the item information and the value of the digest retrieved from the clipboard 136; and authorizing pasting only when they match.

Moreover, a public key is arranged in a storage device in the storage system 1 based on a system policy previously configured by an administrator of the storage system 1. Of the information to be stored on the clipboard 136, the signature information cannot be decrypted with a public key not corresponding to the private key with which the signature information is encrypted, so if the encrypted signature information is decrypted with a public key not corresponding to the private key with which the signature information is encrypted, an error will occur and pasting will not be able to be performed. Consequently, pasting to a storage device without authorization from the administrator can be prevented, and an operation mistake by an operator can also be prevented. It is particularly effective when making settings while displaying more than one GUI screen on the display unit 140.

Second Embodiment

Next, a second embodiment will be described below. In the second embodiment, cases enabling remote-copying in a storage system for three sites will be described. Incidentally, the processing for generating a private key and a public key and configuration processing, etc. is the same as that in the first embodiment, so its descriptions will be omitted. Furthermore, components the same as those in the first embodiment will be numbered with the same reference numerals as those used in the first embodiment, so their detailed descriptions will also be omitted.

Figure 16:
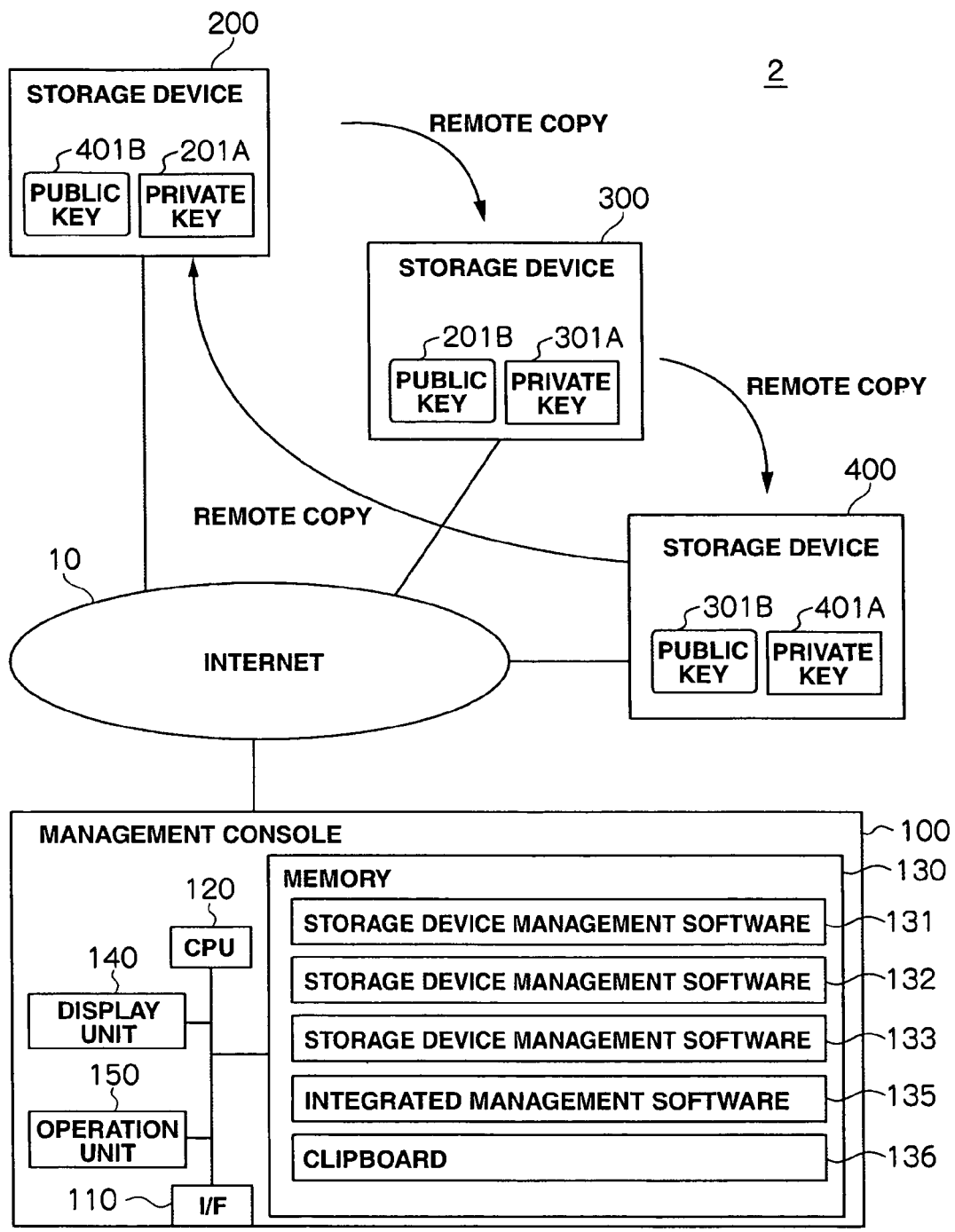
FIG. 16 is a diagram showing the configuration of a storage system according to the second embodiment of the invention.

FIG. 16 is a diagram showing the configuration of a storage system 2. The storage system 2 is provided with the management console 100, the storage device 200, the storage device 300 and the storage device 400. These storage devices 100 to 400 are interconnected via the internet 10 and are capable of communication with one another.

The storage system 2 is configured to perform remote-copying in three sites by remote-copying volumes, from the storage device 200 to the storage device 300; from the storage device 300 to the storage device 400; and from the storage device 400 to the storage device 200. Incidentally, either synchronous remote-copying or asynchronous remote-copying is applicable.

Next, the arrangement of a private key and a public key will be described. The private key 201A, 301A and 401A are respectively kept in the storage device 200, 300 and 400. The public key 201B is kept in the storage device 300. The public key 301B is kept in the storage device 400. The public key 401B is kept in the storage device 200. This arrangement of the public keys is, as described in the first embodiment, arranged based on a system policy configured by an administrator of the storage system.

In the storage system 2 configured as above, when copying and pasting item information from the storage device management software 131 managing the storage device 200 to the storage device management software 132 managing the storage device 300 by using the respective GUI screens, the value of a digest and the value of signature information are stored on the clipboard 136 together with the item information. When pasting information, the signature information is decrypted with the public key 201B by using those values and information; then the item information is confirmed as being authorized to be copied; so that data is judged as not being tampered with by using the value of the digest and the value of the signature information. Then, if no error occurs, the item information can be pasted.

Copying and pasting item information in that manner can be freely performed between the storage device management software 131 to 133.

Specifically, also in the configuration where remote-copying is performed between the storage device 200 and 300, and between the storage device 300 and 400, item information can be easily copied and pasted between the storage device management software 131 and 132; the storage device management software 132 and 133; and the storage device management software 133 and 131 respectively, by using the GUI screens. More specifically, even when displaying more than one GUI screen on the display unit 140 and copying and pasting the item information showing the configuration of remote-copying, an operation mistake such as making a mistake with remote-copy settings for storage devices can be prevented. Furthermore, item information copied to the clipboard 136 can be prevented from being tampered with by using signature information and a public key.

When a failure has occurred in a particular site, such as the storage device 300, the administrator modifies the design of the system policy so that remote-copying is performed between the storage device 200 and the storage device 400. That design modification is implemented so that the public key 201B is kept in the storage device 400; and the public key 401B is kept in the storage device 200. The public keys 201B, 401B are rearranged based on that design modification, so that the storage device management software 131 and the storage device management software 133 are shown on the display unit 140, and item information for remote-copying can be copied from the storage device management software 131 to the storage device management software 133, and vice versa.

Furthermore, in the respective embodiments described above, it can be confirmed that data has not been tampered with by using a digital certificate consisting of a public key and a private key. While public key system is a system to append a signature using a private key and to decrypt with a public key, a storage device in which a signature is appended to data using a private key is arranged as a copy source; and a storage device in which data is decrypted with a public key is arranged as a paste destination, so that copying will have a direction. Safe communication between storage device management software is secured by checking that direction when communicating between GUI screens.

For example, when a failure has occurred in a storage device in a storage system or in a communication line, or when it is necessary to modify a system policy in the middle of processing, such as when it is necessary to modify the configuration settings of a storage device, etc., the administrator modifies the design of the system policy, so that the situation can be easily handled by rearranging a public key based on the modified system policy.

Moreover, when GUI screens are shown in different styles from each storage device management software 131-134, the settings of items, etc. can be copied and pasted by an operator using the clipboard 136, so the operator can operate a storage system intuitively.

Other Embodiments

In the above embodiments, the present invention is described with respect to cases where the storage system 1 includes: storage devices 200-500 and the management console 100 managing the storage devices 200-500 (when an LPR is set in a storage device, the LPR is included as well as the storage device); wherein the management console 100 includes storage device management software 131-134 managing the respective storage devices 200-500, the display unit 140 showing information managed in the storage device management software 131-134, and the clipboard 136 temporarily holding item information when moving item information of the information shown on the display unit 140 to, for example, the storage device management software 133 managing the storage device 400 by means of the storage device management software such as the storage device management software 131 managing one of the storage devices 200-500; wherein the storage devices 200-500 keep the private keys 201A, 301A, 302A, 401A, 501A, 502A, 503A for the respective storage devices to encrypt data, and keep a public key for decrypting data encrypted with the private key in another storage device (for example, the public key 201B of the storage device 200 is kept in the storage device 400), and include a CPU for executing processing for encrypting item information with the private key 201A of the storage device 200 managed by the storage device management software 131 when temporarily holding item information on the clipboard 136, decrypting the encrypted item information with the public key 201B kept in the storage device 400 managed by the storage device management software 133 when moving the encrypted item information to the storage device management software 133, and arranging the item information in the storage device management software 133 based on the processing result; however, the present invention is not limited to these embodiments.

The present invention can be broadly applied in a storage system and a storage system management method.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A storage system, comprising:
a plurality of storage devices; and a management console that manages the plurality of storage devices, wherein each of the storage devices includes: a plurality of hard disk drives for storing data; and a controller configured to control storage of data in the plurality of hard disk drives; the management console includes:
a plurality of storage managers managing each of the plurality of storage devices;
a display unit showing information managed in the storage manager; and a data holding unit that holds item information when moving the item information of the information shown on the display unit by means of a first storage manager that manages one storage device of the plurality of storage devices to a second storage manager that manages other storage devices, and wherein the storage manager arranges a first key in a first storage device to encrypt data, and a second key for decrypting data encrypted with the first key in a second storage device of the plurality of storage devices, when the storage manager accepts a copy operation of a first item in the first storage device, the storage manager; creates first item information based on the first item; generates a first digest of the first item information; sends the first digest to the first storage device;
receives first signature information, which is the encrypted first digest using the first key, from the first storage device; and stores the first item information, the first digest, and the first signature information in the data holding unit, when the storage manager accepts a paste operation of the first item to the second storage device, the storage manager;
retrieves the first item information, the first digest, and the first signature information from the data holding unit; requests the second key from the second storage device; obtains the second key from the second storage device; generates a second digest by decrypting the first signature information using the second key; and if the second digest matches the first digest, sends configuration information for storing the first item in the second storage device to the first storage device and the second storage device, and when the first storage device and the second storage device receive the configuration information, the first storage device and the second storage device configure, a pair of the first item and a second item, which is a copy pair of the first item in the second storage device, based on the configuration information and the first device copies data of the first item to the second storage device.

2. The storage system according to claim 1, wherein the item information relates to a volume.

3. The storage system according to claim 2, wherein:
processing executed by the storage manager for encrypting and holding the item information:
calculates a digest of information relating to the volume; sends the value of the digest to a storage device managed by the second storage manager;
receives information encrypted in the storage device; and
keeps the item information relating to the volume, the value of the digest, and information on the encrypted value of the digest in the data holding unit.

4. The storage system according to claim 3, wherein:
the storage manager, when moving the item information to the second storage manager;
decrypts the value of the digest encrypted with the second key kept in a storage device managed by the second storage manager, and
when the decrypted value of the digest matches the value of a digest held in the data holding unit, moves the item information relating to the volume to the second storage manager.

5. The storage system according to claim 1, wherein:
each storage manager shows a different screen on the display unit depending on the storage device that each storage manager manages.

6. A storage system management method, the storage system including a plurality of storage devices wherein each of the storage devices includes: a plurality of hard disk drives for storing data and a controller configured to control storage of data in the plurality of hard disk drives; and a management console that manages the plurality of storage devices, the management console including: a plurality of storage managers managing each of the plurality of storage devices; a display unit showing information managed in the storage manager; and a data holding unit that holds item information, when moving the item information of the information shown on the display unit by means of a first storage manager that manages one storage device of the plurality of storage devices to a second storage manager that manages other storage devices, and wherein the storage manager arranges a first key in a first storage device to encrypt data, and arranges a second key for decrypting data encrypted with the first key in a second storage device of the plurality of storage devices, the storage system management method comprising: when the storage manager accepts a copy operation of a first item in the first storage device: creating first item information based on the first item; generating a first digest of the first item information; sending the first digest to the first storage device; receiving first signature information, which is the encrypted first digest using the first key, from the first storage device; and storing the first item information, the first digest, and the first signature information in the data holding unit; when the storage manager accepts a paste operation of the first item to the Second storage device: retrieving the first item information, the first digest, and the first signature information from the data holding unit; requesting the second key from the second storage device; obtaining the second key from the second storage device; generating a second digest by decrypting the first signature information using the second key; and if the second digest matches the first digest, sending configuration information for storing the first item in the second storage device to the first storage device and the second storage device; and when the first storage device and the second storage device receive the configuration information: configuring a pair of the first item and a second item by the first storage device and the second storage device, wherein the pair is a copy pair of the first item in the second storage device, based on the configuration information; and copying, data of the first item by the first device to the second storage device.

7. The storage system management method according to claim 6, wherein:
the item information relates to a volume.

8. The storage system management method according to claim 7, further comprising:
calculating a digest of information relating to the volume;
sending the value of the digest to a storage device managed by the second storage manager;
receiving information encrypted in the storage device; and
keeping the item information relating to the volume, the value of the digest, and information on the encrypted value of the digest in the data holding unit.

9. The storage system management method according to claim 8, further comprising:
decrypting the value of the digest encrypted with the second key kept in a storage device managed by the second storage manager; and
when the decrypted value of the digest matches the value of a digest held in the data holding unit, moving the item information relating to the volume to the second storage manager.

10. The storage system management method according to claim 6, wherein:
each storage manager showing a different screen on the display unit depending on the storage device that each storage manager manages.

* * * * *